United States Patent
Matsunaga et al.

(10) Patent No.: US 8,958,970 B2
(45) Date of Patent: Feb. 17, 2015

(54) VEHICLE CONTROL DEVICE AND VEHICLE CONTROL SYSTEM

(75) Inventors: Masaki Matsunaga, Ashigarakami-gun (JP); Nobukazu Ueki, Susono (JP); Hiroshi Tsujii, Mishima (JP); Koji Ito, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/697,145

(22) PCT Filed: May 13, 2010

(86) PCT No.: PCT/JP2010/058130
§ 371 (c)(1),
(2), (4) Date: Nov. 9, 2012

(87) PCT Pub. No.: WO2011/142020
PCT Pub. Date: Nov. 17, 2011

(65) Prior Publication Data
US 2013/0060444 A1    Mar. 7, 2013

(51) Int. Cl.
*G06G 7/70* (2006.01)
*B60K 6/485* (2007.10)
(Continued)

(52) U.S. Cl.
CPC .......... *B60K 6/485* (2013.01); *B60W 30/18072* (2013.01); *Y02T 10/6226* (2013.01);
(Continued)

(58) Field of Classification Search
USPC ........ 701/22, 41, 48, 117, 301; 104/121, 139, 104/295; 180/54.1, 65.2; 123/491; 307/9.1; 382/104; 477/3, 38; 475/150
See application file for complete search history.

(56) References Cited

U.S. PATENT DOCUMENTS 3,225,704 A * 12/1965 Gilvar et al. ............... 104/121
3,254,608 A *  6/1966 Alden ....................... 104/295
(Continued)

FOREIGN PATENT DOCUMENTS

DE       103 07 462 A1    9/2004
DE   10 2007 035 424 A1   1/2009
(Continued)

OTHER PUBLICATIONS

International Search Report Issued Aug. 24, 2010 in PCT/JP10/58130 Filed May 13, 2010.
(Continued)

*Primary Examiner* — James Trammell
*Assistant Examiner* — Sanjeev Malhotra
(74) *Attorney, Agent, or Firm* — Oblon, Spivak, McClelland, Maier & Neustadt, L.L.P.

(57) ABSTRACT

A vehicle control system and a vehicle control device can switch control of a supporting device for support a drive of a vehicle between an ordinary travel in which the vehicle travels in a state that a power source for causing the vehicle to travel is operated and an inertia travel in which the vehicle travels in a state that an operation of the power source is stopped. Accordingly, since the vehicle control system and the vehicle control device switch the control of the supporting device between the ordinary travel and the inertia travel, the vehicle control system and the vehicle control device achieve an effect that the vehicle can be caused to appropriately travel by inertia.

19 Claims, 7 Drawing Sheets

(51) Int. Cl.
  *B60W 30/18* (2012.01)
  *B60Q 1/08* (2006.01)
  *B60W 50/00* (2006.01)

(52) U.S. Cl.
  CPC . *F16D2500/1066* (2013.01); *F16D 2500/5085* (2013.01); *F16D 2500/70424* (2013.01); *B60W 50/0097* (2013.01); *B60W 2030/1809* (2013.01); *B60Q 2300/11* (2013.01); *B60Q 1/085* (2013.01)
  USPC .................. 701/99; 701/22; 701/41; 701/48; 701/117; 701/301; 104/121; 104/139; 104/295; 123/491; 180/54.1; 180/65.2; 307/9.1; 382/104; 477/3; 477/38; 475/150

(56) References Cited

U.S. PATENT DOCUMENTS

| | | | |
|---|---|---|---|
| 3,532,060 A * | 10/1970 | Brush | 104/139 |
| 4,414,937 A | 11/1983 | Ueda et al. | |
| RE32,474 E | 8/1987 | Reid | |
| 6,048,288 A | 4/2000 | Tsujii et al. | |
| 6,190,284 B1 | 2/2001 | Kuroda et al. | |
| 6,267,706 B1 | 7/2001 | Kuroda et al. | |
| 6,401,012 B1 | 6/2002 | Aoki et al. | |
| 6,404,072 B2 | 6/2002 | Onoyama et al. | |
| 7,021,409 B2 | 4/2006 | Tamor | |
| 7,091,629 B2 | 8/2006 | Hawkins | |
| 7,223,204 B2 | 5/2007 | Steen et al. | |
| 7,753,150 B2 | 7/2010 | Tamor | |
| 7,823,668 B2 | 11/2010 | Ogata et al. | |
| 8,370,041 B2 | 2/2013 | Gabor et al. | |
| 2002/0079147 A1* | 6/2002 | Yamaguchi et al. | 180/65.2 |
| 2002/0131621 A1* | 9/2002 | Ohta | 382/104 |
| 2003/0022755 A1 | 1/2003 | Mizutani | |
| 2003/0197385 A1 | 10/2003 | Onoyama et al. | |
| 2003/0221882 A1* | 12/2003 | Long | 180/65.2 |
| 2004/0079342 A1* | 4/2004 | Kojima et al. | 123/491 |
| 2005/0014605 A1 | 1/2005 | Ries-Mueller | |
| 2005/0137769 A1* | 6/2005 | Takamatsu et al. | 701/48 |
| 2005/0209747 A1* | 9/2005 | Yakes et al. | 701/22 |
| 2006/0030450 A1* | 2/2006 | Kyle | 477/3 |
| 2006/0213703 A1* | 9/2006 | Long | 180/65.2 |
| 2006/0228000 A1* | 10/2006 | Miyajima et al. | 382/104 |
| 2007/0215395 A1 | 9/2007 | Ogata et al. | |
| 2007/0288131 A1* | 12/2007 | Yakes et al. | 701/22 |
| 2008/0065285 A1* | 3/2008 | Yakes et al. | 701/22 |
| 2008/0189040 A1* | 8/2008 | Nasu et al. | 701/301 |
| 2008/0238189 A1 | 10/2008 | Kuo et al. | |
| 2010/0107921 A1 | 5/2010 | Kakinuma et al. | |
| 2010/0114448 A1 | 5/2010 | Gabor et al. | |
| 2010/0137100 A1* | 6/2010 | Kojima et al. | 477/38 |
| 2010/0191446 A1 | 7/2010 | McDonald et al. | |
| 2010/0222965 A1* | 9/2010 | Kimura et al. | 701/41 |
| 2010/0222991 A1 | 9/2010 | Berr | |
| 2010/0301668 A1* | 12/2010 | Yakes et al. | 307/9.1 |
| 2011/0071746 A1 | 3/2011 | Gibson et al. | |
| 2011/0212804 A1* | 9/2011 | Imamura et al. | 475/150 |
| 2011/0295453 A1 | 12/2011 | Betz et al. | |
| 2011/0307130 A1 | 12/2011 | Gow et al. | |
| 2011/0320078 A1 | 12/2011 | McGill | |
| 2012/0031688 A1* | 2/2012 | Safranski et al. | 180/54.1 |
| 2012/0323473 A1* | 12/2012 | Irie et al. | 701/117 |
| 2013/0060444 A1 | 3/2013 | Matsunaga et al. | |

FOREIGN PATENT DOCUMENTS

| | | |
|---|---|---|
| JP | 11 2143 | 1/1999 |
| JP | 11-257116 A | 9/1999 |
| JP | 2000-310133 A | 11/2000 |
| JP | 2001-227375 A | 8/2001 |
| JP | 2002-213269 A | 7/2002 |
| JP | 2002 227885 | 8/2002 |
| JP | 2003-153402 A | 5/2003 |
| JP | 2005 88703 | 4/2005 |
| JP | 2005-351202 A | 12/2005 |
| JP | 2006-037780 A | 2/2006 |
| JP | 2006 161684 | 6/2006 |
| JP | 2007 187090 | 7/2007 |
| JP | 2007-246050 A | 9/2007 |
| JP | 2007 255271 | 10/2007 |
| JP | 2007 291919 | 11/2007 |
| JP | 2008-018761 A | 1/2008 |
| JP | 2008-254587 A | 10/2008 |
| JP | 2008-260384 A | 10/2008 |
| JP | 2009-227094 A | 10/2009 |
| JP | 2010-083323 A | 4/2010 |

OTHER PUBLICATIONS

International Search Report issued Jun. 29, 2010 in PCT/JP2010/058452.
English translation of Decision of a Patent Grant issued Jun. 5, 2012 in Patent Application No. 2010-545308.
Office Action issued Aug. 22, 2013 in U.S. Appl. No. 13/060,174.
Office Action issued Jan. 16, 2014 in U.S. Appl. No. 13/058,692.
Office Action issued Aug. 30, 2013 in U.S. Appl. No. 13/058,692.
Office Action issued on Mar. 13, 2014 in co-pending U.S. Appl. No. 13/060,174.

* cited by examiner

VEHICLE CONTROL DEVICE AND VEHICLE CONTROL SYSTEM

FIELD

The present invention relates to a vehicle control device and a vehicle control system.

BACKGROUND

As a conventional vehicle control device or vehicle control system, for example, Patent Literature 1 discloses a speed keeping control device for keeping a travel speed of a vehicle by repeating an accelerated travel state executed by operating an engine and an inertia travel state executed by stopping the engine.

CITATION LIST

Patent Literature

Patent Literature 1: Japanese Patent Application Laid-open No. 2007-187090

SUMMARY

Technical Problem

Incidentally, the speed keeping control device described in Patent Literature 1, it is desired to further improve, for example, an inertia travel of a vehicle.

An object of the present invention, which was made in view of the circumstances, is to provide a vehicle control device and a vehicle control system capable of causing a vehicle to appropriately travel by inertia.

Solution to Problem

In order to achieve the above mentioned object, in a vehicle control device according to the present invention, control of a supporting device for supporting a drive of a vehicle can be switched between an ordinary travel in which the vehicle travels in a state that a power source for causing the vehicle to travel is operated and an inertia travel in which the vehicle travels in a state that an operation of the power source is stopped.

Further, in the vehicle control device, it is possible to configure that the supporting device supports an operation by a driver as a support of the drive.

Further, in the vehicle control device, it is possible to configure that it is made easy to start the support by the supporting device in the inertia travel as compared with the ordinary travel.

Further, in the vehicle control device, it is possible to configure that, in the inertia travel, a preparation of the support is executed before the support is started by the supporting device.

Further, in the vehicle control device, it is possible to configure that the supporting device supports recognition of information by the driver as a support of the drive.

Further, in the vehicle control device, it is possible to configure that the supporting device executes a support for making recognition of the information easy in the inertia travel as compared with the ordinary travel.

Further, in the vehicle control device, it is possible to configure that the support is executed by controlling the supporting device according to a vehicle forward in a travel direction of the vehicle.

Further, in the vehicle control device, it is possible to configure that the control is switched based on peripheral environment information of the vehicle.

Further, in the vehicle control device, it is possible to configure that control can be shifted to control for causing the vehicle to travel by inertia according to an operation while the vehicle travels.

Further, in the vehicle control device, it is possible to configure that the inertia travel is a travel state in which at least any one of an acceleration requesting operation to the vehicle or a deceleration requesting operation to the vehicle is not executed.

Further, in the vehicle control device, it is possible to configure that when a deceleration requesting operation to the vehicle is executed, control is not switched to the control in the inertia travel.

Further, in the vehicle control device, it is possible to configure that a support state of the supporting device is displayed by controlling a display device.

In order to achieve the above mentioned object, a vehicle control system according to the present invention includes a power source configured to cause a vehicle to travel; a supporting device configured to support a drive of the vehicle; and a vehicle control device capable of switching control of the supporting device between an ordinary travel in which the vehicle travels in a state that the power source is operated and an inertia travel in which the vehicle travels in a state that an operation of the power source is stopped.

Further, in the vehicle control system, it is possible to include a display device capable of displaying a support state of the supporting device.

Advantageous Effects of Invention

Since the vehicle control device and the vehicle control system according to the present invention switches control of the supporting device between the ordinary travel and the inertia travel, the vehicle control device and the vehicle control system achieve an effect that the vehicle can be caused to appropriately travel by inertia.

DESCRIPTION OF EMBODIMENTS

Embodiments of a vehicle control device and a vehicle control system according to the present invention will be explained below in detail based on drawings. Note that the present invention is not limited by the embodiment. Further, components in the embodiment include components that can be easily conceived by a person skilled in the art or substantially same components.

First Embodiment

Figure 1:
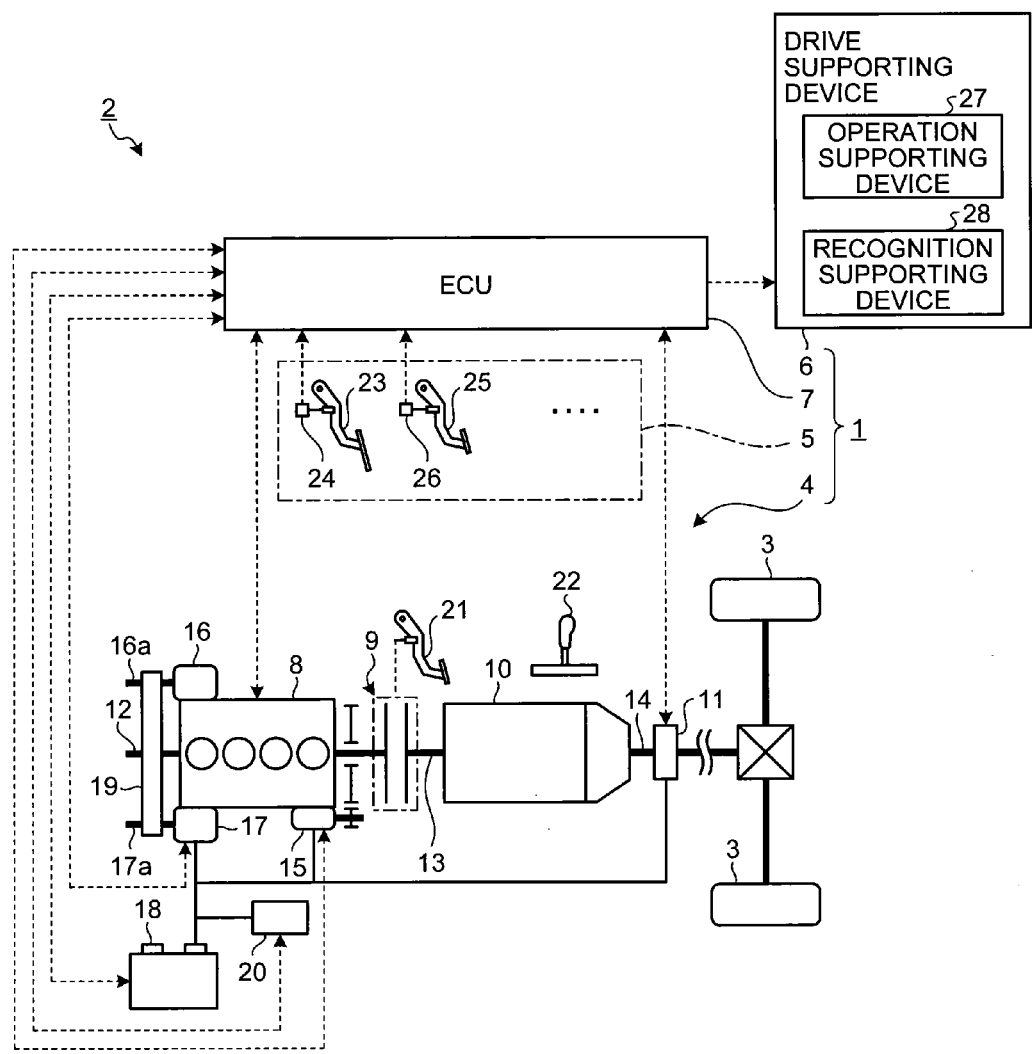
FIG. 1 is a schematic configuration view of a vehicle according to a first embodiment.
Figure 2:
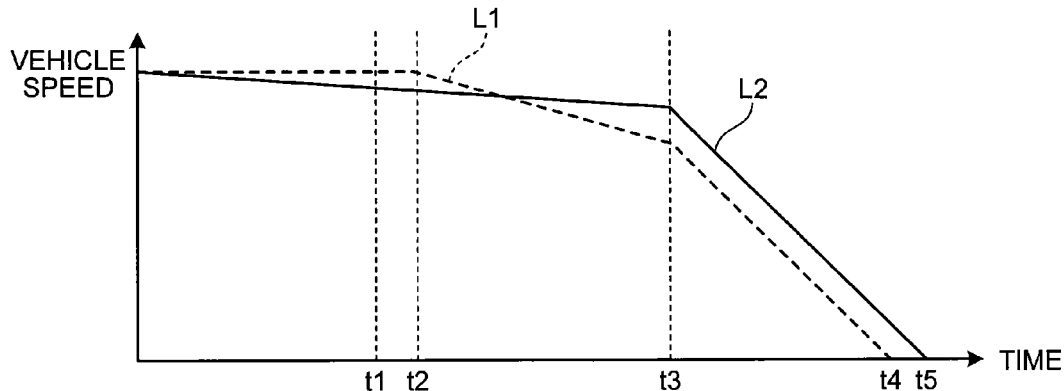
FIG. 2 is a time chart for comparing an inertia travel with an ordinary travel.
Figure 3:
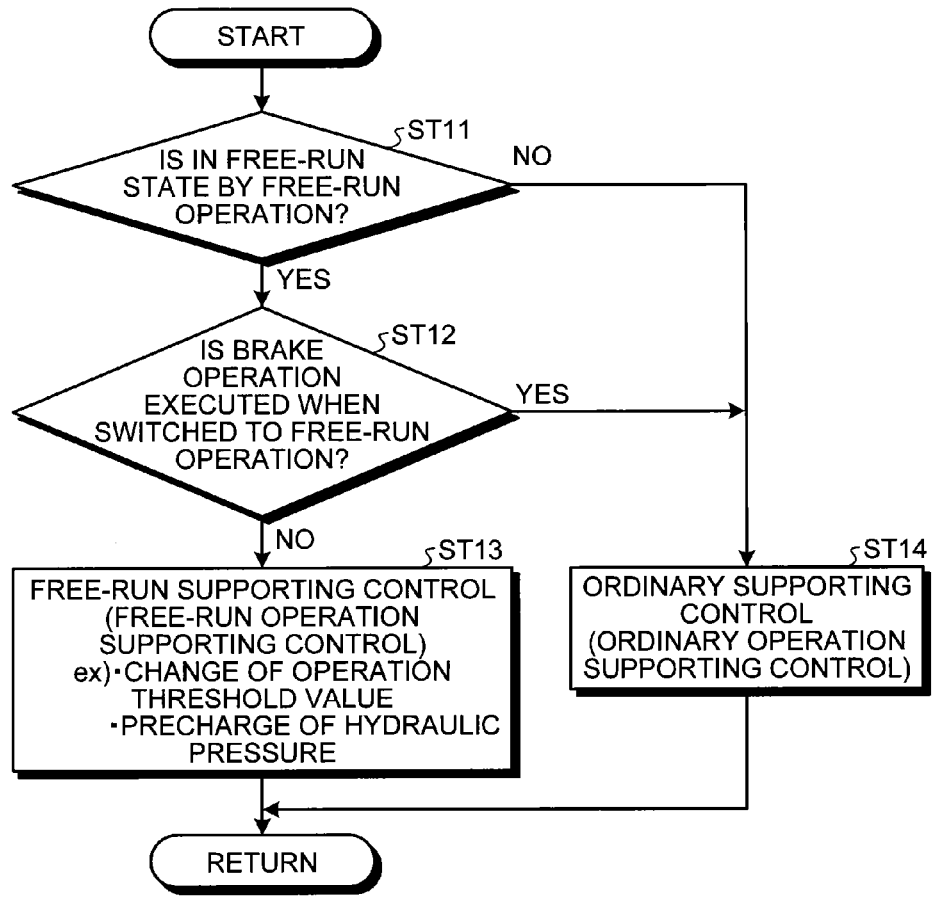
FIG. 3 is a flowchart explaining an example of operation supporting control executed by an ECU according to the first embodiment.
Figure 4:
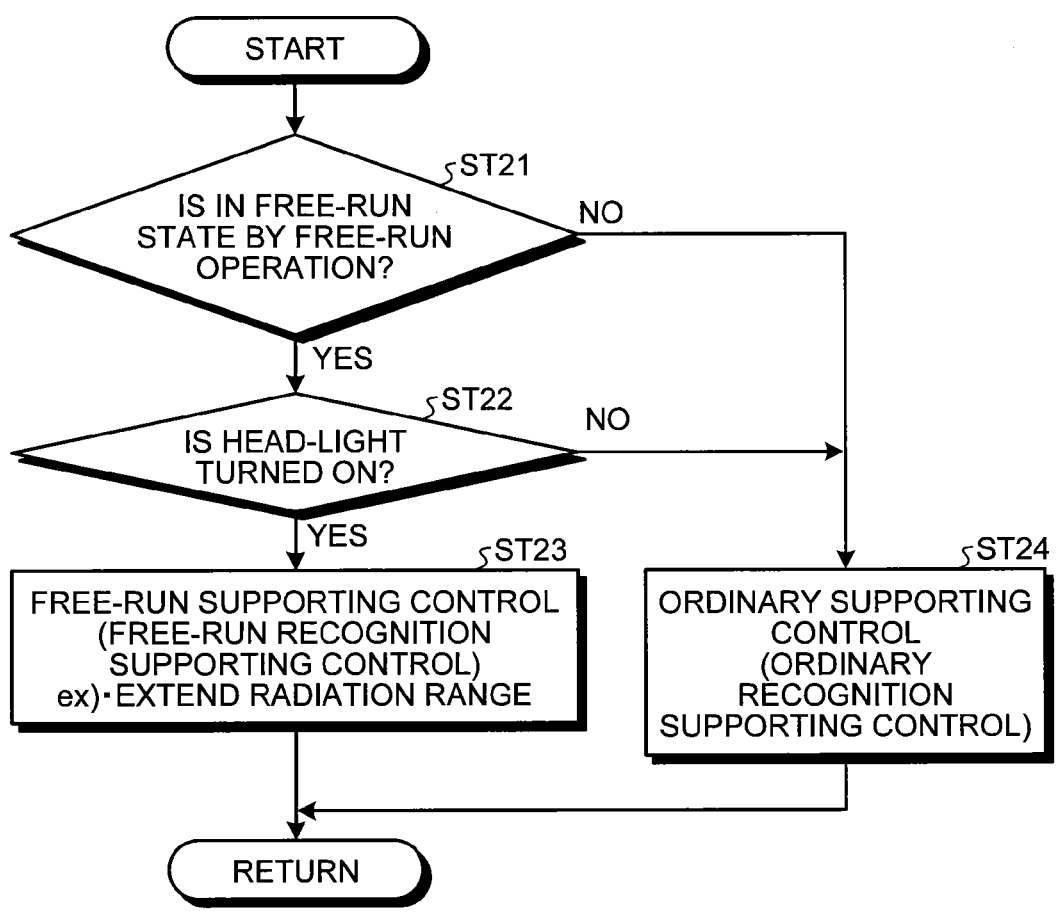
FIG. 4 is a flowchart explaining an example of recognition supporting control executed by the ECU according to the first embodiment.

FIG. 1 is a schematic configuration view of a vehicle according to the first embodiment, FIG. 2 is a time chart for comparing an inertia travel with an ordinary travel, FIG. 3 is a flowchart explaining an example of the operation supporting control executed by an ECU according to the first embodiment, and FIG. 4 is a flowchart explaining an example of recognition supporting control executed by the ECU according to the first embodiment.

As illustrated in FIG. 1, a vehicle control system 1 of the first embodiment is a system mounted on a vehicle 2 to control the vehicle 2. Since the vehicle 2 travels by driving drive wheels 3 in rotation, the vehicle 2 includes a power source for generating power applied to drive wheels 3 of the vehicle 2 as a power source (prime mover) for travelling, that is, an engine 8 as an internal combustion engine which consumes fuel and generates power applied to the drive wheels 3 of the vehicle 2. Note that the vehicle 2 may be a so-called "a hybrid vehicle" which further includes a motor generator and the like as a motor capable of generating power as a power source for travelling in addition to the engine 8.

As illustrated in FIG. 1, the vehicle control system 1 of the embodiment includes a drive device 4, a state detecting device 5, a drive supporting device 6 as a supporting device, and an ECU 7 as a vehicle control device. Typically, the vehicle control system 1 is a system in which the ECU 7 can shift to control for placing the vehicle 2 in a so-called free-run state by stopping an operation of the engine 8 according to an operation of a driver while the vehicle 2 travels and causing the vehicle 2 to travel by inertia (coast down) so that fuel economy is improved thereby.

The drive device 4 has the engine 8 as an internal combustion engine and drives the drive wheels 3 in rotation using the engine 8. More specifically, the drive device 4 is configured including the engine 8, a clutch 9, a transmission 10, a regenerator 11, and the like. In the drive device 4, a crank shaft 12 as an internal combustion engine output shaft of the engine 8 is connected to a transmission input shaft 13 of the transmission 10 via the clutch 9 and a transmission output shaft 14 of the transmission 10 is connected to the drive wheels 3 via a differential mechanism, a drive shaft, and the like.

The engine 8 is a power source for generating power applied to the drive wheels 3 of the vehicle 2 by consuming fuel and can generate engine torque applied to the drive wheels 3 coupled with the drive wheels 3. The engine 8 is a heat engine which converts fuel energy to mechanical work by combusting fuel and outputs the mechanical work and a gasoline engine, a diesel engine, an LPG engine, and the like is exemplified as an example. The engine 8 can cause the crank shaft 12 to generate mechanical power (engine torque) as the fuel is combusted can output the mechanical power from the crank shaft 12 to the drive wheels 3.

The vehicle 2 is configured including various auxiliary machines such as a starter (motor) 15, a compressor (so-called air-con compressor) 16 of an air conditioner (not illustrated), an alternator 17 for indirectly assisting a travel of the vehicle 2. The starter 15 is disposed to the engine 8 and is driven by power supplied from a battery 18. The starter 15 is configured so that an output of the starter 15 is transmitted to the crank shaft 12 via a power transmission unit, and thereby the crank shaft 12 of the engine 8 starts to be rotated (cranked). The compressor 16 and the alternator 17 are disposed to the engine 8 and drive shafts 16a, 17a are coupled with the crank shaft 12 via a power transmission unit (pulley, belt, and the like) 19, and thereby the compressor 16 and the alternator 17 are driven in association with the rotation of the crank shaft 12. For example, the alternator 17 can generate electric power while the engine 8 is driven (while the crank shaft 12 is rotated) and store the power to the battery 18. Note that the vehicle 2 is provided with a electric accumulating unit (battery-boosted converter) 20 in addition to the battery 18 and can also store the generated electric power to the electric accumulating unit 20.

The clutch 9 is a mechanism capable of disconnecting a coupling between the drive wheels 3 and the crank shaft 12 while the vehicle 2 travels and is disposed between the engine 8 and the drive wheels 3 in a power transmission path. The clutch 9 can use various known clutches and connects the crank shaft 12 to the transmission input shaft 13 so that the crank shaft 12 and the transmission input shaft 13 are engaged with each other so as to be able to transmit power and disengaged from each other so as to be unable to transmit power. The clutch 9 can transmit power between the crank shaft 12 and the transmission input shaft 13 by engaging the crank shaft 12 as a rotating member on the engine 8 side with the transmission input shaft 13 as a rotating member on the drive wheels 3 side and can transmit the mechanical power from the crank shaft 12 to the drive wheels 3. Further, the clutch 9 can shut off a transmission of power between the crank shaft 12 and the transmission input shaft 13 by releasing the crank shaft 12 from the transmission input shaft 13 so that the transmission of the mechanical power from the crank shaft 12 to the drive wheels 3 can be shut off. The clutch 9 can be appropriately switched between an engaged state and a disengaged state via a semi-engaged state between the engaged state and the disengaged state according to an operation of a clutch pedal 21 (clutch operation) executed by a driver.

The transmission 10 is disposed between the clutch 9 and the drive wheels 3 in the power transmission path and can change a rotation output of the engine 8 and output the changed rotation output. The transmission 10 can use various known configurations, for example, a manual transmission (MT), a stepped automatic transmission (AT), a continuously variable automatic transmission (CVT), a multi-mode manual transmission (MMT), a sequential manual transmission (SMT), and a dual clutch transmission (DCT). The transmission 10 can change gears at a predetermined gear shift ratio so that rotational power input to the transmission input shaft 13 is changed, can transmit the rotational power to the transmission output shaft 14, and can output the rotational power from the transmission output shaft 14 to the drive wheels 3.

In the explanation below, it is assumed that the transmission 10 is a manual transmission unless otherwise particularly described. The transmission 10 as the manual transmission has gear stages (gear shift stages) and an optional one of the gear stages is selected according to an operation (shift operation) of a shift lever 22 by the driver. Since the transmission 10 transmits power via the selected gear stage, the transmission 10 changes the rotational power input to the transmission input shaft 13 according to a gear shift ratio allocated to the selected gear stage and outputs the rotational power from the transmission output shaft 14. Further, the transmission 10 is configured including a so-called N (neutral) position. In the transmission 10, when the N position is selected by the shift operation by the driver, no gears are engaged between the transmission input shaft 13 and the transmission output shaft 14, and the transmission input shaft 13 is released from the transmission output shaft 14. Accordingly, when the N position is selected, since the transmission of the mechanical power from the crank shaft 12 to the drive wheels 3 is shut off even if the clutch 9 is engaged, the transmission 10 does not transmit power from the engine 8.

The regenerator 11 regenerates motion energy while the vehicle 2 travels. The regenerator 11 is a device having a function as a generator for converting input mechanical power to electric power. The regenerator 11 can control whether or not electric power is generated while the engine 8 is at rest and is disposed to the power transmission path from the transmission output shaft 14 of the transmission 10 to the drive wheels 3. The regenerator 11 can generate power by regeneration by, for example, that the transmission output shaft 14 or a rotating shaft such as a propeller shaft integrally rotatably coupled with the transmission output shaft 14 is rotated by receiving mechanical power, and electric power generated by the power generation is stored in an electric power storage device such as the battery 18 and the electric accumulating unit 20. At the time, the regenerator 11 can brake (regeneratively brake) the rotation by a rotation resistance generated to the transmission output shaft 14 or to the rotating shaft integrally rotatably coupled with the transmission output shaft 14, with a result that braking force can be applied to the vehicle 2. Although the regenerator 11 is composed of, for example, a generator such as an alternator and a motor capable of operating as the generator, the regenerator 11 may be composed of a rotating electric machine having also a function as an electric motor for converting electric power supplied thereto to mechanical power, that is, may be composed of a so-called motor generator. Note that the vehicle 2 includes hydraulic brake devices (not illustrated) and the like in addition to the regenerator 11.

The drive device 4 configured as described above can transmit power generated by the engine 8 to the drive shaft 3 via the clutch 9 and the transmission 10. As a result, since driving force [N] is generated on a road surface in contact with the drive wheels 3 so that the vehicle 2 can travel by the driving force [N]. Further, when the regenerative brake is applied by the regenerator 11, the drive device 4 can cause the transmission output shaft 14 or the rerating shaft integrally rotatably coupled with the transmission output shaft 14 to generate regeneration torque that is negative torque by regeneration. As a result, the braking force [N] is generated on the road surface in contact with the drive wheels 3 so that the vehicle 2 is braked by the braking force [N].

The state detecting device 5 detects a state of the vehicle 2 and is configured including various sensors. The state detecting device 5 is electrically connected to the ECU 7 and can mutually transmit and receive information such as a detection signal, a drive signal, and a control instruction. As the state of the vehicle 2, the vehicle 2 may include, for example, an operation state of the driver to the vehicle 2, a travel environment state of the vehicle 2, and a state of the vehicle 2 itself. The state detecting device 5 includes, for example, an accelerator sensor 24 for detecting an operation amount of an accelerator pedal 23 operated by the driver and a brake sensor 26 for detecting an operation amount of a brake pedal 25 operated by the driver. The operation amount of the accelerator pedal 23 is, for example, an accelerator opening degree and typically corresponds to a value according to an operation amount of an acceleration requesting operation requested to the vehicle 2 by the driver. An operation amount of a brake pedal 25 is, for example, a pedal depression force of the brake pedal 25 and typically corresponds to a value according to an operation amount of a braking requesting operation requested to the vehicle 2 by the driver. Further, an accelerator operation to be described later is the acceleration requesting operation to the vehicle 2 and typically an operation for depressing the accelerator pedal 23 by the driver. Further, a brake operation is a brake requesting operation to the vehicle 2 and typically an operation for depressing the brake pedal 25 by the driver. A state that the accelerator operation and the brake operation are turned off is a state that the accelerator opening degree and the pedal depression force are a predetermined value or less and typically 0 or less.

The drive supporting device 6 is a device for supporting a drive of the vehicle 2 by the driver and is controlled by the ECU 7. The drive supporting device 6 will be explained later in detail.

The ECU 7 controls a drive of each device of the vehicle 2 such as the drive device 4. The ECU 7 is an electronic circuit mainly composed of a known microcomputer including a CPU, ROM, RAM, and an interface. The ECU 7 is electrically connected with various sensors disposed to respective sections of the drive device 4 such as the engine 8. The ECU 7 is electrically connected with various auxiliary machines such as a fuel injection unit, an ignition unit, and a throttle valve unit of the engine 8, the regenerator 11, the battery 18, an inverter (not illustrated), the starter 15 and the alternator 17, and the electric accumulating unit 20, and further when the transmission 10 is, for example, the AT, the CVT, the MMT, the SMT, and the DCT, the ECU 7 is connected to the clutch 9 and the transmission 10 via a hydraulic control device (not illustrated). The ECU 7 is input with electric signals corresponding to detected results detected from the various sensors, outputs a drive signal to the respective units according to the detected results input thereto, and controls drives of the respective units.

The ECU 7 can switch between an operation state and a non-operation state of the engine 8 by starting or stopping the engine 8 while the vehicle 2 travels. The state that the engine 8 is operated is a state in which heat energy generated by combusting fuel in a combustion chamber is output as mechanical energy such as torque. In contrast, the non-operation state of the engine 8, that is, the state that the operation of the engine 8 is stopped is a state in which fuel is not combusted in the combustion chamber and mechanical energy such as torque is not output.

As described above, the ECU 7 can shift to the control for placing the vehicle 2 in the so-called free-run state by stopping consumption of fuel in the engine 8 of the drive device 4 according to a predetermined operation of the driver while the vehicle 2 travels and causing the vehicle 2 to travel by inertia. That is, the vehicle 2 can shift to a free-run in which the vehicle 2 travels by inertia according to an operation by an intention of the driver. In the free-run state of the vehicle 2, the ECU 7 of the embodiment executes power source stop control for stopping a supply of fuel to the combustion chamber of the engine 8 (fuel cut) and stopping a generation of power by the engine 8. With the operation, the ECU 7 can execute the inertia travel for causing the vehicle 2 to travel by inertia via inertia force of the vehicle 2 without causing the engine 8 and the like of the drive device 4 to output mechanical power so that fuel economy can be improved. That is, the free-run state of the vehicle 2 is a state in which the drive shaft 3 is not applied with drive torque (driving force) resulting from engine torque generated by the engine 8 (motor torque when a motor generator is provided) and with brake torque (braking force) resulting from engine brake torque generated by the engine 8 and brake torque generated by the brake devices and the vehicle 2 travels by its inertia force, and the free-run state is executed according to a predetermined free-run (inertia travel) operation by the driver.

Note that, when the vehicle 2 is mounted with the regenerator 11 as described above, the ECU 7 basically prohibits regeneration executed by the regenerator 11 or suppresses a power generation by the regenerator 11 to a minimum necessary amount, and makes regeneration torque generated by the regenerator 11 to a required minimum amount when the vehicle 2 is in the free-run state. With the operation, the ECU 7 can suppress a reduction of effect of an improvement of the fuel economy achieved by using the free-run while the vehicle 2 travels.

When, for example, the transmission 10 is the MT as in the embodiment, a predetermined free-run operation of the driver is a series of operations in which the driver turns off an accelerator operation while the vehicle 2 travels, releases the clutch 9 by a clutch operation, selects the N position by a shift operation, and then engages the clutch 9. When the driver executes the predetermined free-run operation while the vehicle 2 travels, the ECU 7 shifts to control for stopping consumption of fuel in the drive device 4 and places the vehicle 2 in the free-run state by causing the vehicle 2 to travel by inertia. Note that when the transmission 10 is the AT, the CVT, the MMT, the SMT, and the DCT, the predetermined free-run operation of the driver is, for example, a series of operation in which the driver turns off the accelerator operation and the brake operation while the vehicle 2 travels (for example, an operation for selecting an N range by a shift operation may be added to the above operations). Further, the predetermined free-run operation of the driver is not limited to the operations described above and may be, for example, an operation of a switch and a lever dedicated to the free-run operation.

Further, the ECU 7 can shift to control for placing the engine 8 in an operating state by starting (resuming) the consumption of fuel in the engine 8 of the drive device 4 according to a predetermined operation of the driver while the vehicle 2 travels in the free-run and placing the vehicle 2 in an ordinary travel state. The ordinary travel state of the vehicle 2 is a travel state in which drive torque (driving force) resulting from the engine torque generated by the engine 8 (motor torque when the motor generator is provided) or brake torque (braking force) resulting from engine brake torque generated by the engine 8, regeneration torque generated by the regenerator 11, and brake torque generated by the brake devices are applied to the drive wheels 3, and the ordinary travel state is executed according to a predetermined free-run release operation executed by the driver. The predetermined free-run release operation of the driver is, for example, an operation such as a gear shift operation to a predetermined gear stage or an operation for turning on an accelerator operation or the brake operation while the vehicle 2 travels in the free-run.

Note that, the vehicle control system 1 can optionally execute the free-run by that the driver recognizes information as to a drive of the vehicle 2 by himself or herself and executes the free-run operation by an intention of the driver according to the recognized information. As a result, the vehicle control system 1 can suppress information and a device necessary to control as compared with a case that the free-run is executed as a part of a so-called automatic travel, for example, an auto cruise travel for automatically controlling a vehicle speed to a predetermined vehicle speed, an automatic follow-up travel for automatically executing a follow-up travel at a predetermined inter-vehicle distance to a preceding vehicle, or a travel for causing a vehicle to travel by automatic control by creating a route plan (target locus) from a given condition and creating a travel plan according to the route plan. Accordingly, the vehicle control system 1 can improve the fuel economy by a simpler configuration, and therefore a suppression of manufacturing cost and an improvement of fuel economy can be achieved at the same time.

Incidentally, the vehicle control system 1 of the embodiment can cause the vehicle 2 to travel by inertia more appropriately by, for example, that the ECU 7 switches control of the drive supporting device 6 between when the vehicle 2 travels ordinarily and when the vehicle 2 travels by inertia, that is, when the vehicle 2 is in the free-run.

specifically, the ECU 7 of the embodiment can execute drive supporting control for supporting a drive of the vehicle 2 by the driver by controlling the drive supporting device 6. As the drive supporting control, the ECU 7 can execute ordinary supporting control executed when the vehicle 2 ordinarily travels and free-run supporting control executed when the vehicle 2 travels in the free-run (travels by inertia) by switching the ordinary supporting control and the free-run supporting control according to a travel state.

More specifically, the ordinary travel is a travel using power generated by the engine 8 in an operation state in which the engine 8 operates as power for travel. In contrast, as described above, the free-run (inertia travel) is a travel in a state that the consumption of fuel by the engine 8 is stopped in the non-operation state in which the operation of the engine 8 is stopped and is typically a travel in which a coupling between the crank shaft 12 and the drive wheels 3 is disconnected by the clutch 9 or the transmission 10 and a rotation of the crank shaft 12 is stopped. Typically, the vehicle 2 is decelerated by a travel resistance received from, for example, a road surface and the atmosphere at the time of free-run.

The free-run (inertia travel) of the vehicle 2 is typically a travel state in which at least any one of the acceleration requesting operation, that is, the accelerator operation to the vehicle 2 or a deceleration requesting operation, that is, the brake operation to the vehicle 2 is not executed and is here, a travel state in which both the accelerator operation and the brake operation are not executed as described above.

For example, the driver drives the vehicle 2 by recognizing information and operating the vehicle 2 according to the recognized information. A drive support executed by the drive supporting device 6 includes, for example, an operational support for supporting an operation of the vehicle 2 by the driver and a recognition support for supporting recognition of information by the driver. The drive supporting device 6 is configured including an operation supporting device 27 and a recognition supporting device 28. The ECU 7 can execute the operation supporting control for supporting the operation of the vehicle 2 by the driver by controlling the operation supporting device 27 and can execute the recognition supporting control for supporting the recognition of information by the driver by controlling the recognition supporting device 28 as a support of a drive.

The operation supporting device 27 supports (assists) the operation of the vehicle 2 by the driver as the support of the drive. The operation supporting device 27 is typically various devices for controlling a motion, a behavior and a posture of the vehicle 2 by supporting the operation of the vehicle 2 by the driver and is, for example, a device for controlling, for example, a safety and the like of the vehicle 2.

The operation supporting device 27 is configured including a brake actuator and the like for realizing, for example, so-called ABS (Antilock Brake System, brake lock prevention) function, a BA (Brake Assist) function, a VSC (Vehicle Stability Control (lateral slip prevention)) function of the vehicle 2. The brake actuator acting as the operation supporting device 27 is composed of, for example, a hydraulic control device (hydraulic control circuit) controlled by the ECU 7. The brake actuator is configured including pipings, an oil reservoir, an oil pump, hydraulic pipings connected to wheel cylinders of the brake devices disposed to the drive wheels 3, respectively and electromagnetic valves for increasing, reducing, and keeping the hydraulic pressure of the hydraulic pipings. Since the brake actuator is controlled by the ECU 7, the brake actuator can individually adjust (increase, reduce, and keep) the wheel cylinder pressures acting on the drive wheels 3 according to an operation amount (depression amount) of the brake pedal 25 by the driver or according to a state of the vehicle 2 so that the brake actuator can adjust the braking forces acting on the drive wheels 3. That is, the brake actuator can individually adjust the braking forces acting on the drive wheels 3 according to a travel state of the vehicle 2 independently of the operation of the brake pedal 25 by the driver. The ECU 7 executes the operation supporting control by, for example, controlling the brake actuator acting as the operation supporting device 27.

Note that the operation supporting device 27 may be configured including various types of an actuator, a stabilizer, an electrically driven power steering, and an active suspension for realizing a so-called TRC (Traction Control System, traction control) function, a VDIM (Vehicle Dynamics Integrated Management, active steering integration control) function, and the operation supporting control may be executed by controlling them.

The recognition supporting device 28 supports (assists) the recognition of information by the driver as the support of the drive. The recognition supporting device 28 is typically various devices for providing the driver with useful information for drive while the driver drives the vehicle 2 and for reducing a load on the driver when the driver obtains information and is, for example, a device for supporting a safety management in drive by making it easy for the driver to recognize information.

The recognition supporting device 28 is configured including, for example, a head light and the like for assisting a visual recognition of information by the driver by extending a visually recognizable field of view of the driver by radiating light at night. The head light acting as the recognition supporting device 28 assists a forward recognition in an insufficient light amount state by, for example, radiating light. The head light acting as the recognition supporting device 28 can use a head light having an automatic leveling function and a head light capable of changing a radiation range. The automatic leveling function is a function for adjusting an optical axis of the head light up and down in a vertical direction. The ECU 7 executes the recognition supporting control by controlling, for example, the recognition supporting device 28 acting as the head light.

Note that the recognition supporting device 28 may be configured including various information notifying devices for notifying information to the driver, and the recognition supporting control may be executed by controlling the devices. The information notifying device may be any device, for example, a visually sensed information display device such as an LCD screen, an indicator and the like attached to a navigation device, an audio output device such as a speaker and the like for outputting acoustic information such as voice and buzzer sound, and a tactile information output device for outputting tactile information such as steering wheel vibration, seat vibration, and pedal reaction force as long as the devices can notify various information to the driver. Further, the information notifying device may be, for example, a peripheral information notifying device for notifying peripheral information of the vehicle 2 using a so-called night vision (device) and a radar.

The ECU 7 can execute ordinary operation supporting control executed when the vehicle 2 ordinarily travels and free-run operation supporting control executed when the vehicle 2 travels in the free-run as the recognition supporting control by switching the ordinary operation supporting control and the free-run operation supporting control according to a travel state. Likewise, the ECU 7 can execute ordinary recognition supporting control executed when the vehicle 2 ordinarily travels and free-run recognition supporting control executed when the vehicle 2 travels in the free-run as the recognition supporting control by switching the ordinary recognition supporting control and the free-run recognition supporting control according to a travel state. In other words, the ECU 7 can execute the ordinary operation supporting control and the ordinary recognition supporting control as the ordinary supporting control as well as can execute the free-run operation supporting control and the free-run recognition supporting control as the free-run supporting control.

In the vehicle control system 1 of the embodiment, a state in which the vehicle 2 travels in the free-run is defined as a state in which the drive support must be executed more positively as compared with a state in which the vehicle travels ordinarily. That is, at the time of free-run, the vehicle 2 of the embodiment basically travels by inertia using inertia force without applying any of drive torque (driving force) resulting from the engine 8 and brake torque (braking force) resulting from the engine 8, the regenerator 11 and the brake devices to the drive shaft 3 as described above. Accordingly, in the free-run state, since behavior stability of the vehicle 2 tends to be relatively lowered, it can be said that the drive support must be executed more positively and the safety management must be executed more positively.

In a time chart of FIG. 2, for example, a horizontal axis is a time axis, a vertical axis shows a vehicle speed, a dotted line L1 shows a vehicle speed at the time of ordinary travel, and a solid line L2 shows a vehicle speed at the time of free-run (inertia travel). As exemplified also in the drawing, when the vehicle 2 travels ordinarily, as illustrated by the dotted line L1 when the driver recognizes information of forward environment at a time t1, the driver releases a foot from the accelerator pedal 23 at a time t2 (accelerator operation is turned off). Then, the vehicle 2 is applied with an engine brake after the time t2 and decelerated thereby. When the driver depresses the brake pedal 25 (brake operation is turned on) at a time t3, the vehicle 2 is applied with braking force by the brake devices after the time t3 and stops at a time t4. In contrast, when the vehicle 2 travels in the free-run, as illustrated by the solid line L2, the driver recognizes the information of the forward environment at the time t1, an inertia travel continues until the brake pedal 25 is depressed at the time t3, and the vehicle 2 is gradually decelerated by a travel resistance. During the period, when the vehicle 2 travels in the free-run, since no engine brake is applied different from the ordinary travel, a deceleration is relatively reduced as compared with the ordinary travel. Accordingly, the speed of the vehicle 2 at the time t3 tends to increase at the time of free-run than at the time of ordinary travel. When braking force as large as that at the time of ordinary travel is applied to the vehicle 2 in the state after the time t3, the vehicle 2 stops at a time t5 later than the time t4. That is, in the free-run, a period from a recognition time at which the driver recognizes the forward environment to a time at which the vehicle 2 stops tends to become relatively longer as compared with the ordinary travel. Accordingly, it can be said that the free-run state of the vehicle 2 is the state in which the drive support must be executed more positively and the safety management must be executed more positively also from the point.

Further, as described above, since the free-run state of the vehicle 2 of the embodiment is a travel state in which any of the accelerator operation and the brake operation is not executed and the driver may originally have a relatively low intention for operation such as the acceleration operation and the brake operation, there is a tendency that the driver is likely to delay in the execution of the accelerator operation and the brake operation when, for example, a behavior of the vehicle 2 is disturbed. Accordingly, the free-run state of the vehicle 2 is the state in which the drive support must be executed more positively and the safety management must be executed more positively also from the point.

Further, in the vehicle control system 1 of the embodiment, since the driver recognizes information by himself or herself and optionally executes the free-run by executing the free-run operation by the intention of the driver according to the recognized information, basically the driver recognizes information, executes an operation, drives the vehicle 2, and executes the safety management by himself or herself. Accordingly, since the tendency described above is outstanding in the vehicle control system 1 as compared with, for example, a case that the free-run is executed as a part of the automatic travel described above, the vehicle control system 1 is in the state in which the drive support must be executed more positively and the safety management must be executed more positively in the free-run state of the vehicle 2 also from the point in the free-run state of the vehicle 2. Further, since the tendency described above is outstanding in the vehicle control system 1 due to an influence that the driver intentionally uses the free-run positively to improve the fuel economy as compared with, for example, the case that the free-run is executed as the part of the automatic travel described above, it can be said that the vehicle control system 1 is in the state in which the drive support must be executed more positively and the safety management must be executed more positively in the free-run state of the vehicle 2 also from the point in the free-run state of the vehicle 2.

Further, since the free-run state of the vehicle 2 of the embodiment is a state in which the intension for operation of the driver is not shown to the vehicle 2 side as described above and the accelerator operation and the brake operation by the driver tend to be likely to delay as well as the vehicle 2 travels by inertia via inertia force and there is a tendency that stability of the behavior of the vehicle 2 is relatively lowered as described above, it can be said that the vehicle control system 1 is in the state in which the drive support must be executed more positively and the safety management must be executed more positively as compared with the automatic travel such as the auto cruise travel explained above. When, for example, a steady travel state is maintained in the automatic travel such as the auto cruise travel, basically, weak driving force is steadily applied to the drive wheels 3, whereas since the free-run state of the vehicle 2 of the embodiment is a state in which the vehicle 2 travels by inertia via inertia force, the vehicle 2 is in a state in which driving force and braking force other than a travel resistance is not applied to the drive wheels 3. Accordingly, the vehicle 2 has a tendency that vehicle stability is relatively lowered in the free-run state in, for example, wheel alignment (for example, toe angle) and the like as compared with the steady travel state in the automatic travel. This is because the wheel alignment is ordinarily adjusted so that a linear travelling property and a turning property are stabilized based on a reference in which weak driving force is applied to the drive wheels 3.

Accordingly, the ECU 7 of the embodiment switches the drive supporting control of the drive supporting device 6 so that the drive support is more intensively executed when the vehicle 2 travels in the free-run than when the vehicle 2 travels ordinarily. Typically, when the ECU 7 detects that the vehicle 2 is in the free-run state, the ECU 7 positively changes the drive supporting control of the drive supporting device 6 to a safety side. As a result, the vehicle control system 1 can cope with the tendency described above in the free-run state and can appropriately execute the free-run.

Specifically, the operation of the vehicle 2 by the driver is more intensively supported when the vehicle 2 travels in the free-run than when the vehicle 2 travels ordinarily and the ECU 7 switches the operation supporting control of the operation supporting device 27 so that the operation supporting control is more positively executed on a safe side.

When the vehicle 2 travels in the free-run, the ECU 7 makes it easy to start the operational support by the operation supporting device 27 as compared with the ordinary travel. When the vehicle 2 shifts from the ordinary travel to the free-run, the ECU 7 switches the operation supporting control from the ordinary operation supporting control to the free-run operation supporting control, whereas when the vehicle 2 shifts from the free-run to the ordinary travel, the ECU 7 switches the operation supporting control from the free-run operation supporting control to the ordinary operation supporting control.

Typically, an operation start condition of the operational support of the ordinary operation supporting control is different from an operation start condition of the free-run operation supporting control, and the operation start condition of the operational support of the ordinary operation supporting control and the operation start condition of the free-run operation supporting control are set so that the operational support by the operation supporting device 27 can be more easily started in the operation start condition of the free-run operation supporting control than in the operation start condition of the ordinary operation supporting control. In other words, the ECU 7 switches the ordinary operation supporting control and the free-run operation supporting control by switching the start conditions of the operational support by the operation supporting device 27.

When the ordinary operation supporting control is switched to the free-run operation supporting control, the ECU 7 changes a depression amount (pedal depression force) and a depression speed of the brake pedal 25, parameters such as a yaw rate deviation or operation threshold values set to the parameters, which are used to determine whether or not control, for example, ABS control, BA control, or VSC control by the operation supporting device 27 is started, to sides where the control can be easily started. For example, the ECU 7 changes the operation threshold values to sides where the operational support by the operation supporting device 27 is executed at an earlier timing in the free-run operation supporting control than in the ordinary operation supporting control.

As a result, in the vehicle control system 1, when the vehicle 2 travels ordinarily, since the ECU 7 executes the ordinary operation supporting control as the operation supporting control, it can be suppressed that the operational support is executed by the operation supporting device 27 more than necessary in the ordinary travel so that it can be suppressed, for example, that energy necessary to control the operation supporting device 27 is wastefully consumed. In the vehicle control system 1, when the vehicle 2 travels in the free-run, since the ECU 7 executes the free-run operation supporting control as the operation supporting control, it can be suppressed that the operational support by the operation supporting device 27 is delayed and thus even if a behavior and a posture of the vehicle 2 are disturbed, the stability of the vehicle 2 can be certainly maintained.

In the vehicle control system 1, it may be made easy to start the operational support by the operation supporting device 27 in, for example, the automatic travel such as the auto cruise travel described above. However, as described above, the free-run state of the vehicle 2 of the embodiment is a state in which the drive support must be executed more positively and the safety management must be executed more positively as compared with the automatic travel such as the auto cruise travel. Accordingly, when the free-run operation supporting control is executed, the ECU 7 makes it easier to start the operational support by the operation supporting device 27 as compared with, for example, the automatic travel. That is, the ECU 7 changes the operation threshold values to sides where the operational support by the operation supporting device 27 can be more easily started in the free-run operation supporting control than in the automatic travel control. More specifically, even in, for example, the free-run while the vehicle 2 travels automatically, the ECU 7 executes the free-run operation supporting control for making it easier to start the operational support by the operation supporting device 27 earlier. Even while, for example, the vehicle 2 travels automatically, the ECU 7 switches the operation supporting control of the operation supporting device 27 between when the vehicle 2 travels ordinarily and when the vehicle 2 travels in the free-run.

Further, when the vehicle 2 travels in the free-run, the ECU 7 may make a preparation for the operational support before the operational support by the operation supporting device 27 starts. That is, the ECU 7 may execute control for making the preparation of the operational support before the operational support by the operation supporting device 27 starts as the free-run operation supporting control. In the case, as, for example, the free-run operation supporting control, the ECU 7 controls the hydraulic control device (hydraulic pressure control circuit) such as the brake actuator acting as the operation supporting device 27 and executes a precharge of hydraulic pressure. When the vehicle 2 travels in the free-run, the ECU 7 can previously pressurize a dead zone of a hydraulic drive of the hydraulic control device by executing the precharge of the hydraulic pressure as the preparation of the operational support, with a result that a time until the operational support by the operation supporting device 27 actually operates and an effect of the operational support actually appears can be reduced.

As a result, in the vehicle control system 1, when the vehicle 2 travels ordinarily, since the ECU 7 executes the ordinary operation supporting control as the operation supporting control, it can be suppressed that a hydraulic pressure of the hydraulic control device is pressurized more than necessary in the ordinary travel so that it can be suppressed, for example, that energy necessary for pressurization is wastefully consumed. In the vehicle control system 1, when the vehicle 2 travels in the free-run, since the ECU 7 executes the free-run operation supporting control as the operation supporting control and thus the time until the operational support by the operation supporting device 27 actually operates and the effect of the operational support actually appears can be reduced, the operational support by the operation supporting device 27 can be started with good responsiveness.

Further, the ECU 7 switches the recognition supporting control of the recognition supporting device 28 between when the vehicle 2 travels ordinarily and when the vehicle 2 travels in the free-run so that the support of recognition of information by the driver is more intensified and is more positively set to a safety side when the vehicle 2 travels in the free-run than when the vehicle 2 travels ordinarily.

The ECU 7 executes a support for making recognition of information easy when the vehicle 2 travels in the free-run as compared with when the vehicle 2 travels ordinarily by the recognition supporting device 28. When the vehicle 2 shifts from the ordinary travel to the free-run, the ECU 7 switches the recognition supporting control from the ordinary recognition supporting control to the free-run recognition supporting control, whereas when the vehicle 2 shifts from the free-run to the ordinary travel, the ECU 7 switches the recognition supporting control from the free-run recognition supporting control to the ordinary recognition supporting control. An operation of the recognition supporting device 28 in the recognition support is different between the ordinary recognition supporting control, and the free-run recognition supporting control, and the recognition support of the free-run recognition supporting control is set so that the driver can more easily recognize information than the recognition support of the ordinary recognition supporting control.

When the ordinary recognition supporting control is switched to the free-run recognition supporting control, the ECU 7 relatively extends the radiation range of light by switching, for example, the optical axis of the head light acting as the recognition supporting device 28 up in the vertical direction or increasing a light amount. As a result, the ECU 7 causes the driver to recognize information of the forward environment more easily when the vehicle 2 travels in the free-run as compared with when the vehicle 2 travels ordinarily.

As a result, in the vehicle control system 1, when the vehicle 2 travels ordinarily, since the ECU 7 executes the ordinary recognition supporting control as the recognition supporting control, it can be suppressed that the recognition support of the recognition supporting device 28 is executed more than necessary in the ordinary travel so that it can be suppressed, for example, that energy necessary for the control of the recognition supporting device 28 is wastefully consumed. In the vehicle control system 1, when the vehicle 2 travels in the free-run, since the ECU 7 executes the free-run recognition supporting control as the recognition supporting control, the driver is caused to recognize information easily so that the driver can execute various determinations early. With the operation, when the vehicle 2 travels in the free-run, the vehicle control system 1 can assist the driver so that a time (for example, the time t1 in FIG. 2) at which the driver recognizes forward environment information such as a change of a road surface is advanced and thus, for example a delay of the accelerator operation and the brake operation by the driver can be suppressed, with a result that the safety management by the driver himself or herself can be improved.

Next, an example of the operation supporting control by the ECU 7 will be explained referring to a flowchart of FIG. 3. Note that these control routines are repeatedly executed at a control cycle of several milliseconds to several tens of milliseconds (this is the same in the following explanation).

First, the ECU 7 obtains various information from the state detecting device 5 and determines whether or not a present travel state of the vehicle 2 is the free-run state by the free-run operation of the driver (ST11).

When the ECU 7 determines that the present travel state of the vehicle 2 is the free-run state by the free-run operation of the driver (ST11: Yes), the ECU 7 determines whether or not the free-run operation is executed and the brake operation is executed by the driver when the ordinary travel is switched to the free-run (ST12).

When the ECU 7 determines that the brake operation is not executed by the driver (ST12: No), the ECU 7 executes the free-run operation supporting control (free-run supporting control) as the operation supporting control, or when the brake operation has been executed, the ECU 7 continues the brake operation as it is (ST13), finishes a present control cycle, and goes to a next control cycle. The ECU 7 changes the operation threshold values to make it easy for the operation supporting device 27 to start the operational support and executes the precharge of hydraulic pressure as the free-run operation supporting control. With the operation, in the vehicle control system 1, the support of the operation of the vehicle 2 by the driver is intensified so that a preparation is made more positively on the safety side to cope with a disturbance of behavior of the vehicle 2.

When the ECU 7 determines at ST11 that the present travel state of the vehicle 2 is not the free-run state by the free-run operation of the driver (ST11: No) or determines that the brake operation is executed by the driver at ST12 (ST12: Yes), the ECU 7 executes the ordinary operation supporting control (ordinary supporting control) as the operation supporting control or when the brake operation has been executed, the ECU 7 continues the brake operation as it is (ST14), finishes the present control cycle, and goes to the next control cycle. That is, when, for example, the brake operation (deceleration requesting operation) is executed to the vehicle 2 just after the shift to the free-run, since the driver actively shows an intention for braking and actually executes the brake operation, the ECU 7 does not switch the operation supporting control, that is, does not switch from the ordinary operation supporting control to the free-run operation supporting control. With the operation, the vehicle control system 1 can suppress to wastefully consume energy.

Next, an example of the recognition supporting control by the ECU 7 will be explained referring to a flowchart of FIG. 4.

First, the ECU 7 obtains various information from the state detecting device 5 and determines whether or not a present travel state of the vehicle 2 is the free-run state by the free-run operation of the driver (ST21).

When the ECU 7 determines that the present travel state of the vehicle 2 is the free-run state by the free-run operation of the driver (ST21: Yes), the ECU 7 determines whether or not the head light acting as the recognition supporting device 28 is turn on (ST22).

When the ECU 7 determines that the head light is turn on (ST22: Yes), the ECU 7 executes the free-run recognition supporting control (free-run supporting control) as the recognition supporting control or when the free-run recognition supporting control has been executed, the ECU 7 continues the free-run recognition supporting control as it is (ST23), finishes a present control cycle, and goes to a next control cycle. As the free-run recognition supporting control, the ECU 7 relatively extends the radiation range of light by the head light acting as the recognition supporting device 28. With the operation, in the vehicle control system 1, the support of the recognition of information by the driver is intensified the driver is assisted to recognize information such as the change of the road surface earlier.

When the ECU 7 determines at ST21 that the present travel state of the vehicle 2 is not the free-run state by the free-run operation of the driver (ST21: No) or determines at ST22 that the head light is not turned on (ST22: No), the ECU 7 executes the ordinary recognition supporting control (ordinary supporting control) as the recognition supporting control or when the ordinary recognition supporting control has been executed, the ECU 7 continues the ordinary recognition supporting control as it is (ST24), finishes the present control cycle, and goes to the next control cycle.

As a result, the vehicle control system 1 and the ECU 7 can realize the improvement of fuel economy by the free-run and the like at low cost while keeping safety of the vehicle 2 at a maximum.

According to the ECU 7 according to the embodiment explained above, the control of the drive supporting device 6 for supporting the drive of the vehicle 2 can be switched between the ordinary travel in which the vehicle 2 travels in a state that the engine 8 for causing the vehicle 2 to travel is operated and the inertia travel (free-run) in which the vehicle 2 travels in a state that an operation of the engine 8 is stopped. The vehicle control system 1 according to the embodiment explained above includes the engine 8 for causing the vehicle 2 to travel, the drive supporting device 6 for supporting the drive of the vehicle 2, and the ECU 7. Accordingly, since the vehicle control system 1 and the ECU 7 switch the control of the drive supporting device 6 between the ordinary travel and the inertia travel, the vehicle 2 can be caused to appropriately travel by inertia.

Second Embodiment

Figure 5:
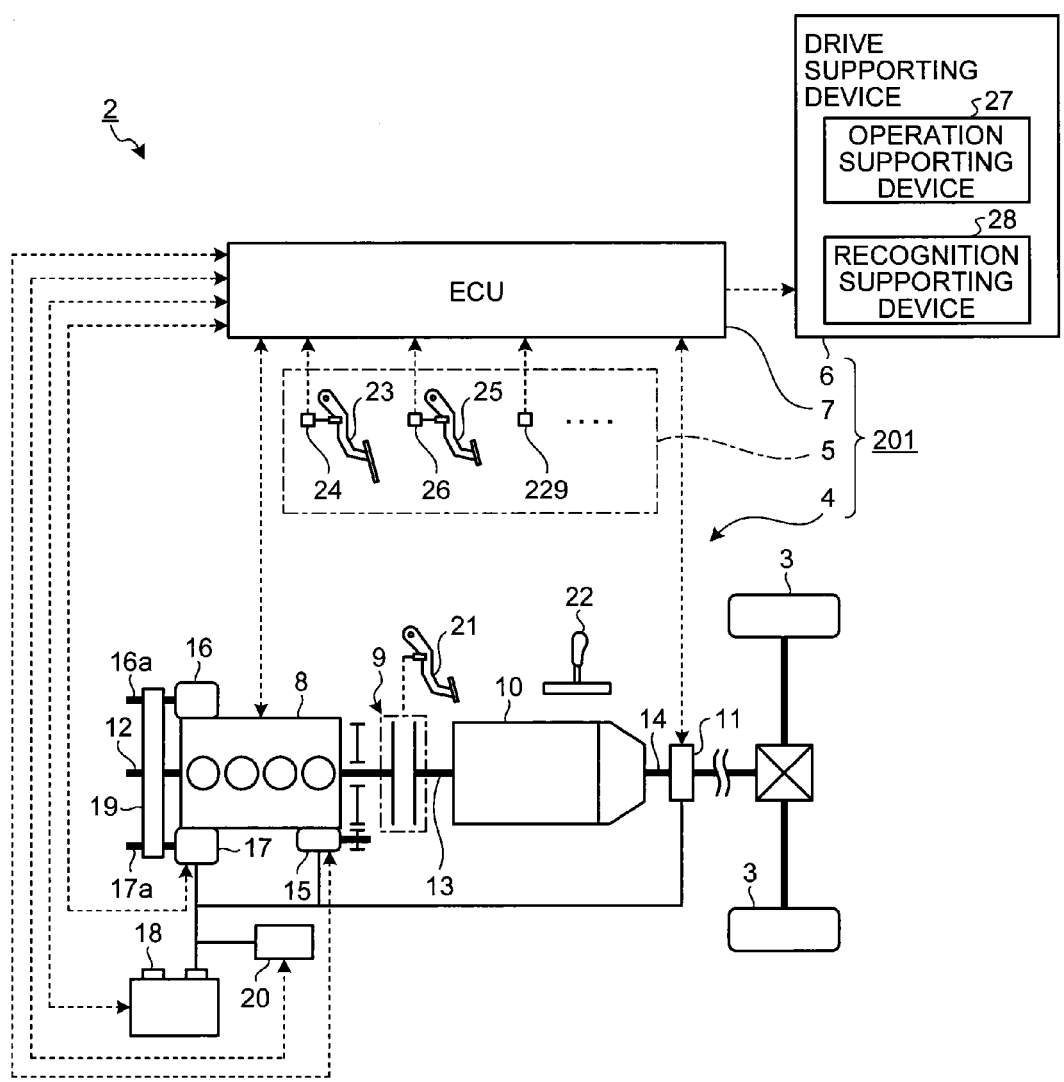
FIG. 5 is a schematic configuration view of a vehicle according to a second embodiment.
Figure 6:
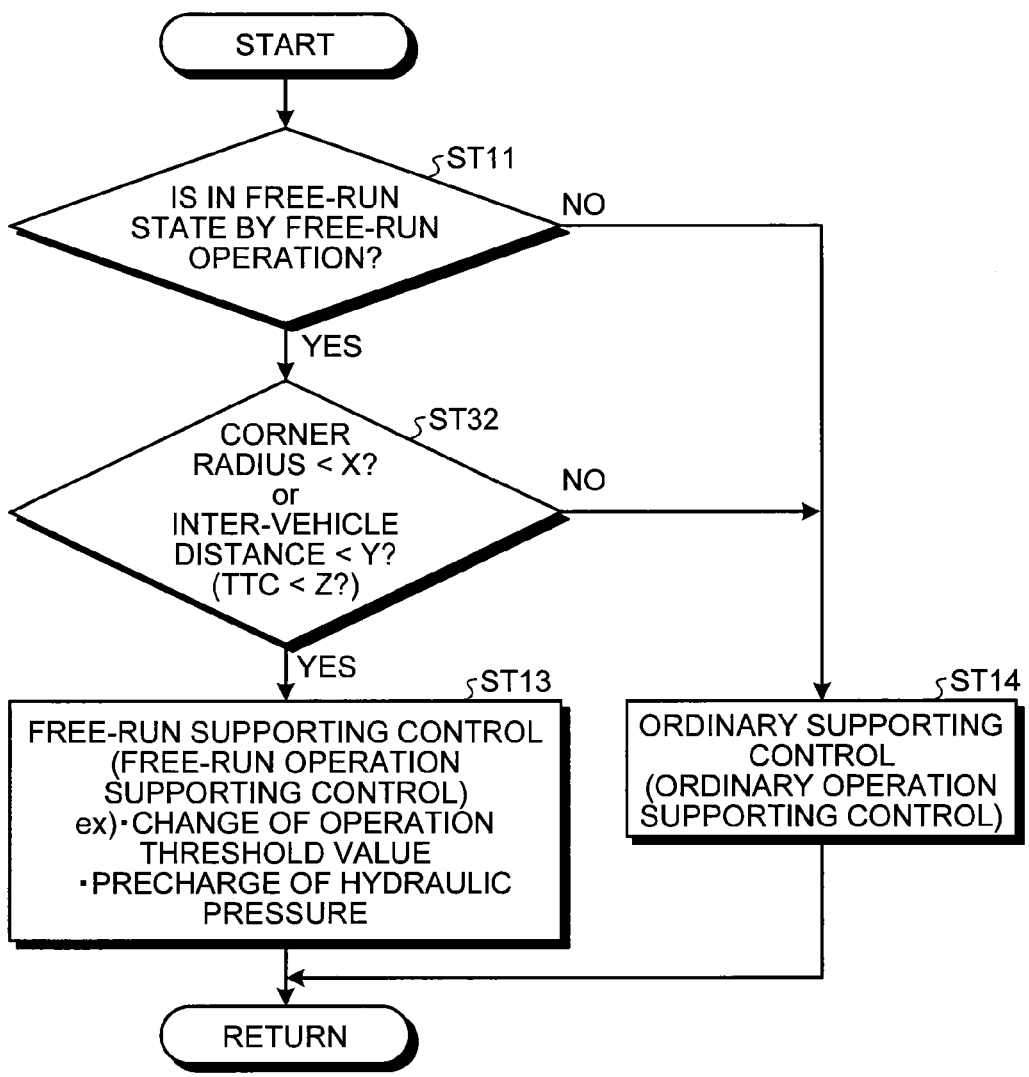
FIG. 6 is a flowchart explaining an example of operation supporting control executed by an ECU according to the second embodiment.

FIG. 5 is a schematic configuration view of a vehicle according to a second embodiment, and FIG. 6 is a flowchart explaining an example of operation supporting control executed by an ECU according to the second embodiment. A vehicle control device and a vehicle control system according to the second embodiment is different from the first embodiment in that control is switched based on peripheral environment information of the vehicle. By the way, a duplicate explanation of a configuration, an operation, and an effect that are common to the embodiment described above will not be repeated as far as possible as well as the same reference numerals are employed (this is the same in the embodiment explained below).

As illustrated in FIG. 5, in a vehicle control system 201 of the embodiment, a state detecting device 5 has a peripheral environment information acquiring device 229. The peripheral environment information acquiring device 229 is a device for obtaining information of a peripheral environment of a vehicle 2 as a driver's own vehicle and is configured including, for example, a vehicle-mounted camera, a radar, a GPS device, or a navigation device.

The ECU 7 of the embodiment switches control of a drive supporting device 6 based on the peripheral environment information of the vehicle 2 obtained by the peripheral environment information acquiring device 229. The ECU 7 obtains, for example, present position information of the vehicle 2 and map information from the peripheral environment information acquiring device 229, obtains information as to whether or not a corner exists forward in a travel direction and a radius (curvature) of the corner, and controls the drive supporting device 6 based on the information. Further, the ECU 7 may obtain information as to, for example, an inter-vehicle distance and a positional relation to other vehicle (preceding vehicle and oncoming vehicle) forward in the travel direction from the peripheral environment information acquiring device 229 and may control the drive supporting device 6 according to the information.

When the vehicle 2 travels in a free-run, the ECU 7 determines whether or not it is necessary to switch control based on the peripheral environment information of the vehicle 2 and switches drive supporting control according to the determination. In the case, even if the vehicle 2 travels in the free-run, the ECU 7 may continue ordinary supporting control without switching the ordinary supporting control to free-run operation supporting control depending on a result of determination whether or not the switching is necessary.

Next, an example of the operation supporting control by the ECU 7 will be explained referring to a flowchart of FIG. 6. Note that although the example of the operation supporting control will be explained here, since approximately the same control is executed even in recognition supporting control; an explanation of the recognition supporting control is not repeated. Further, an explanation that duplicates that of the first embodiment will not be repeated as far as possible.

When the ECU 7 determines that a present travel state of the vehicle 2 is in a free-run state by a free-run operation by a driver (ST11: Yes), the ECU 7 obtains peripheral environment information of the vehicle 2 from the peripheral environment information acquiring device 229 and determines, for example, whether or not the radius of the corner forward in the travel direction is smaller than a preset and predetermined radius X or the inter-vehicle distance to the other vehicle forward in the travel direction is shorter than a preset and predetermined distance Y based on the obtained peripheral environment information (ST32). Note that the ECU 7 may determine, for example, whether or not a time TTC, which is obtained by converting the inter-vehicle distance to the other vehicle forward in the travel direction according to a vehicle speed, is shorter than a preset and predetermined time Z in place of the determination whether or not the inter-vehicle distance to the other vehicle forward in the travel direction is shorter than the preset and predetermined distance Y. Further, the predetermined radius X, the predetermined distance Y, and the predetermined time Z are preferably set based on whether or not there exists an environment in which a drive support must be executed more positively and a safety management must be executed more positively.

When the ECU 7 determines that the radius of the corner is smaller than the predetermined radius X or the inter-vehicle distance is shorter than the predetermined distance Y (time TTC is shorter than the predetermined time Z) (ST32: Yes), the ECU 7 executes the free-run operation supporting control (free-run supporting control) (ST13), finishes a present control cycle, and goes to a next control cycle. When the ECU 7 determines that the radius of the corner is equal to or more than the predetermined radius X as well as the inter-vehicle distance is equal to or more than the predetermined distance Y (the time TTC is equal to or more than predetermined time Z) (ST32: No), the ECU 7 does not switch the ordinary supporting control to the free-run operation supporting control although the vehicle 2 is in the free-run state, executes the ordinary operation supporting control (ordinary supporting control) (ST14), finishes the present control cycle, and goes to the next control cycle.

As a result, when an peripheral environment of the vehicle 2 is an environment in which it is not necessary to positively execute the safety management although the vehicle 2 is in the free-run state, the vehicle control system 201 and the ECU 7 can suppress that an operational support of an operation supporting device 27 is executed more than necessary and, for example, can suppress that energy necessary to control the operation supporting device 27 is wastefully consumed. When the vehicle 2 is in the free-run state as well as the peripheral environment of the vehicle 2 is an embodiment in which it is necessary to execute the safety management more positively, the vehicle control system 201 and the ECU 7 can execute the drive support more positively as well as efficiently. Note that the ECU 7 may change an operation start condition of the operational support of the operation supporting device 27 based on the peripheral environment information of the vehicle 2.

According to the vehicle control system 201 and the ECU 7 explained above, control of the drive supporting device 6 is switched based on the peripheral environment information of the vehicle 2. Accordingly, the vehicle control system 201 and the ECU 7 can cause the vehicle 2 to travel by inertia appropriately as well as effectively according to the peripheral environment of the vehicle 2.

Note that although the explanation is made assuming that whether or not the operation supporting control by the operation supporting device 27 is switched is determined based on the peripheral environment information of the vehicle 2, the ECU 7 may determine whether or not the recognition supporting control by a recognition supporting device 28 is switched based on the peripheral environment information of the vehicle 2. In the case, the ECU 7 may execute a support by controlling, for example, the drive supporting device 6, here, the recognition supporting device 28 according to the other vehicle forward in the travel direction of the vehicle 2.

Figure 7:
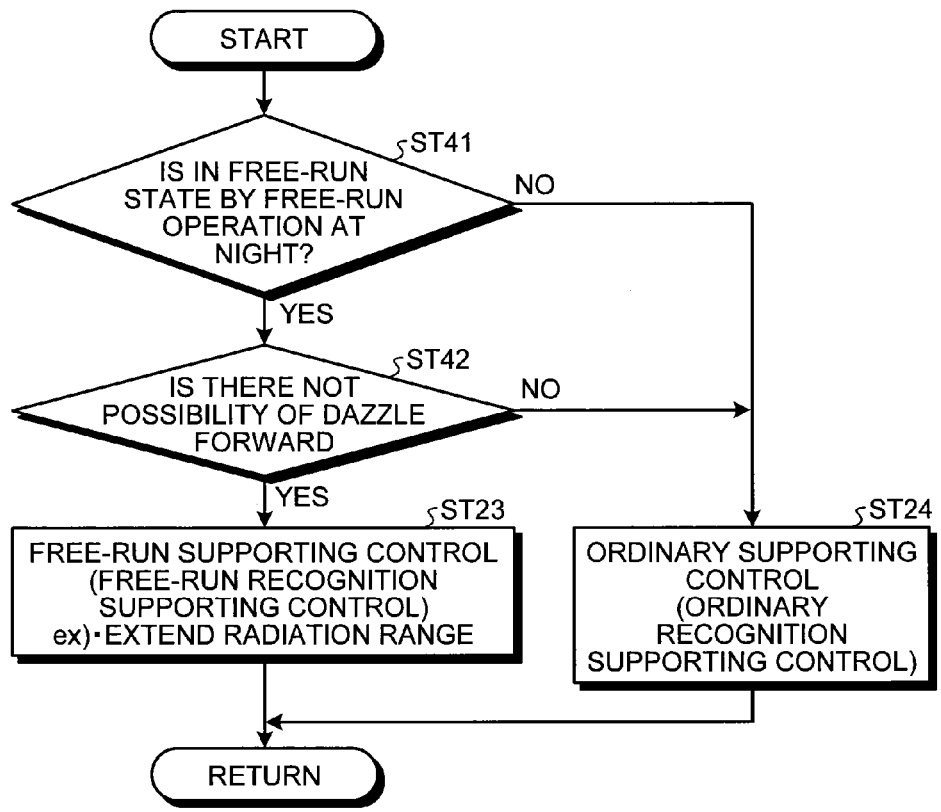
FIG. 7 is a flowchart explaining an example of recognition supporting control executed by an ECU according to a modification.

Specifically, as illustrated in a flowchart of FIG. 7, the ECU 7, first determines whether or not a present travel state of the vehicle 2 is the free-run state at night by a free-run operation of a driver (ST41). When the ECU 7 determines that the present travel state of the vehicle 2 is the free-run state at night by the free-run operation of the driver (ST41: Yes), the ECU 7 obtains the peripheral environment information of the vehicle 2 from the peripheral environment information acquiring device 229 and obtains whether or not other vehicle exists forward in the travel distance of the vehicle 2 and an inter-vehicle distance based on the obtained peripheral environment information. The ECU 7 determines whether or not there is a possibility that glare light (glare light) is given to an occupant of other vehicle (preceding vehicle and oncoming vehicle) and the occupant is dazzled by the glare light when a radiation range of light by the head light acting as the recognition supporting device 28 is relatively extended based on whether or not the other vehicle exists forward in the travel direction of the vehicle 2 (ST42).

When the ECU 7 determines that there is not the possibility that the occupant is dazzled (ST42: Yes), the ECU 7 executes the free-run recognition supporting control (free-run supporting control) (ST23), whereas when the ECU 7 determines that the present travel state of the vehicle 2 is not the free-run state at night by the free-run operation of the driver (ST41: No) or that there is the possibility that the occupant is dazzled (ST42: No), the ECU 7 executes the ordinary recognition supporting control (ordinary supporting control) (ST24). As a result, the vehicle control system 201 and the ECU 7 can cause the vehicle 2 to travel by inertia appropriately according to the peripheral environment of the vehicle 2, for example, in consideration of the other vehicle forward in the travel direction of the vehicle 2.

Figure 8:
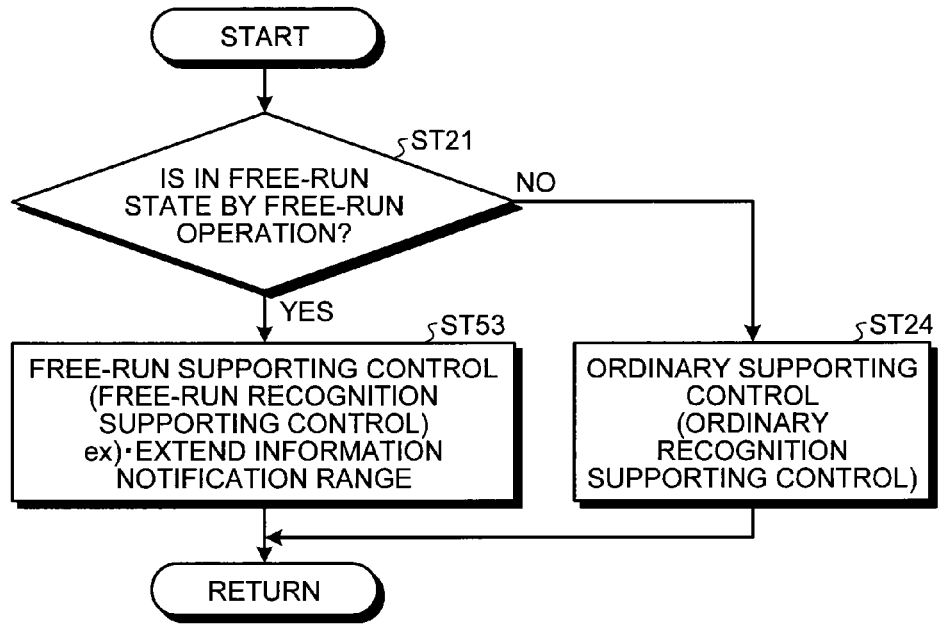
FIG. 8 is a flowchart explaining an example of the recognition supporting control executed by the ECU according to the modification.

Although the explanation described above is made assuming that the ECU 7 executes the control for relatively extending the radiation range of light by the head light acting as the recognition supporting device 28 as the free-run recognition supporting control, the free-run recognition supporting control is not limited thereto. When the recognition supporting device 28 is configured including a peripheral information notifying device for notifying peripheral information of the vehicle 2 using, for example, a night vision and a radar, the ECU 7 may execute the free-run recognition supporting control by controlling the peripheral information notifying device acting as the recognition supporting device 28 as illustrated in a flowchart of FIG. 8. In the case, when the ECU 7 determines that the present travel state of the vehicle 2 is the free-run state by the free-run operation of the driver (ST21: Yes), the ECU 7 can execute the free-run recognition supporting control (free-run supporting control) omitting the process at ST22 explained in FIG. 4 (ST53).

When the ECU 7 executes the free-run recognition supporting control by controlling the peripheral information notifying device acting as the recognition supporting device 28, the ECU 7 extends a notification range for notifying information to the driver in a range in which, for example, information notified to the driver via the peripheral information notifying device becomes excessive or in a range which is suitable according to a vehicle speed and a vehicle deceleration speed. As a result, since the ECU 7 can execute a support for making it easy for the driver to recognize information via the recognition supporting device 28, a support for recognition of information by the driver is intensified, an assist for advancing a timing at which information such as a change of a road surface is recognized by the driver can be executed, and the vehicle 2 can be prompted to execute an inertia travel according to, for example, the peripheral environment.

Third Embodiment

Figure 9:
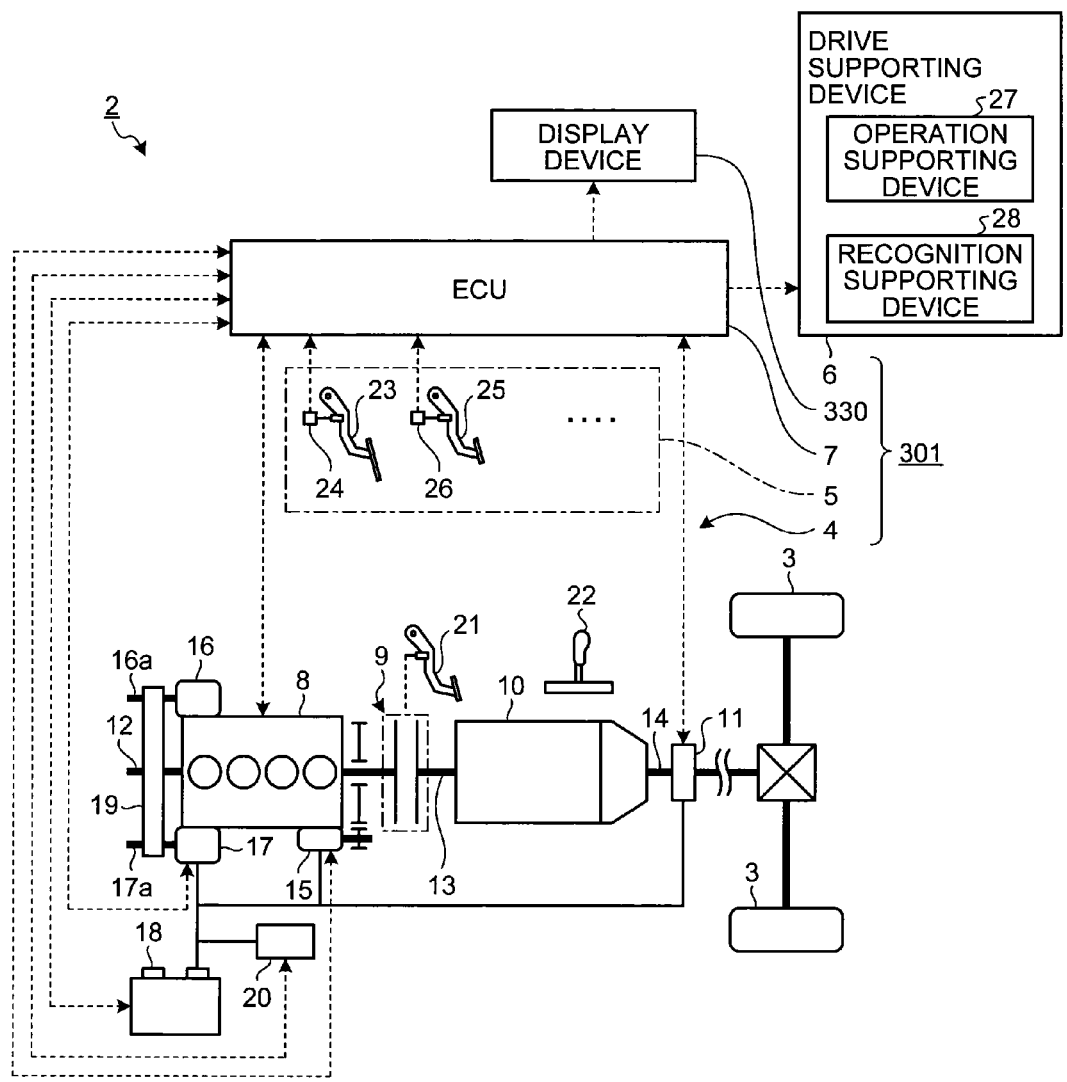
FIG. 9 is a schematic configuration view of a vehicle according to a third embodiment.

FIG. 9 is a schematic configuration view of a vehicle according to a third embodiment. A vehicle control device and a vehicle control system according to the third embodiment is different from the first embodiment in that a support state of a supporting device is displayed by controlling a display device.

As illustrated in FIG. 9, a vehicle control system 301 of the embodiment includes a display device 330. The display device 330 can display information and here can display a support state of a drive supporting device 6. An ECU 7 of the embodiment controls the display device 330 and displays the support state of the drive supporting device 6.

The display device 330 is composed of, for example, an indicator and the like and controlled by the ECU 7. The ECU 7 controls the display device 330 and displays the support state of the drive supporting device 6, for example, ON/OFF of a drive support by the drive supporting device 6. The ECU 7 individually displays ON/OFF of an operational support by an operation supporting device 27 acting as the drive supporting device 6 and ON/OFF of a recognition support by a recognition supporting device 28 on the display device 330 as the support state of the drive supporting device 6.

The vehicle control system 301 and the ECU 7 according to the embodiment explained above control the display device 330 and display the support state of the drive supporting device 6. Accordingly, the vehicle control system 301 and the ECU 7 can appropriately transmit the support state of the drive supporting device 6 to a driver and can prompt the driver to execute, for example, an appropriate drive according to the support state of the drive supporting device 6.

Note that the display device 330 may be composed of, for example, an LCD screen attached to a navigation device or a so-called HUD (Head-Up Display). Further, the ECU 7 may control the display device 330 and display contents of the operational support by the drive supporting device 6 (contents of the operational support by the operation supporting device 27 and contents of the recognition support by the recognition supporting device 28) as the support state of the drive supporting device 6.

Note that the vehicle control device and vehicle control system according to the embodiment of the present invention are not restricted to the embodiments described above and can be variously changed within a scope described in the claims.

Although the explanation described above is made assuming that the ECU 7 switches both the operation supporting control of the operation supporting device 27 and the recognition supporting control of the recognition supporting device 28 are switched between when the vehicle 2 travels ordinarily and when the vehicle 2 travels in the free-run, the present invention is not limited thereto and only any one of them may be switched.

Although the explanation described above is made assuming that the ECU 7 makes it easier at the time of free-run (inertia travel) as compared with at the time of ordinary travel to start the support by the drive supporting device 6 and executes the support for causing the drive supporting device 6 to recognize information easily, the present invention is not limited thereto and the ECU 7 may change contents themselves of the control.

Although the explanation described above is made assuming that the vehicle control system 1 can shift to the control by which the ECU 7 stops the operation of the engine 8 according to the operation of the driver while the vehicle 2 travels, causes the vehicle 2 to travel by inertia, and places the vehicle 2 in the free-run state, the vehicle control system 1 may automatically shift to control by which the vehicle 2 is automatically placed in the free-run state by control of the ECU 7 according to the state of the vehicle 2 without depending on the operation of the driver.

Although the explanation described above is made assuming that the vehicle control system 1 includes the regenerator 11, the present invention is not limited thereto and may be configured so as not to include the regenerator 11. Further, although the explanation described above is made assuming that the power source is the engine 8, the present invention is not limited to and the power source may be, for example, a motor generator.

Although the explanation described above is made assuming that, in the free-run state of the vehicle 2, the coupling between the crank shaft 12 and the drive wheels 3 is disconnected by the clutch 9 or the transmission 10 and the rotation of the crank shaft 12 is stopped, the present invention is not limited thereto. In the free-run state of the vehicle 2, it is basically sufficient that the engine 8 is placed in the non-operation state and the vehicle 2 travels by inertia, and the free-run state may be, for example, a state in which the coupling between the crank shaft 12 and the drive shaft 3 is maintained and the crank shaft 12 is rotated following the drive shaft 3, that is, a state in which brake torque resulting from engine brake torque is applied to the drive wheels 3.

INDUSTRIAL APPLICABILITY

As described above, the vehicle control device and the vehicle control system according to the present invention are preferably applied to a vehicle control device and a vehicle control system mounted on various vehicles.

REFERENCE SIGNS LIST 1, 201, 301 VEHICLE CONTROL SYSTEM
2 VEHICLE
3 DRIVE SHAFT
4 DRIVE DEVICE
5 STATE DETECTING DEVICE
6 DRIVE SUPPORTING DEVICE (SUPPORTING DEVICE)
7 ECU (VEHICLE CONTROL DEVICE)

8 ENGINE (POWER SOURCE)
9 CLUTCH
27 OPERATION SUPPORTING DEVICE
28 RECOGNITION SUPPORTING DEVICE
229 PERIPHERAL ENVIRONMENT INFORMATION ACQUIRING DEVICE
330 DISPLAY DEVICE

The invention claimed is:

1. A vehicle control device, comprising:
a power source configured to cause a vehicle to travel;
a supporting device configured to support a drive of the vehicle; and
a controller configured to switch control of the supporting device for supporting the drive of the vehicle between an ordinary travel in which the vehicle travels in a first state that the power source for causing the vehicle to travel is operated and an inertia travel in which the vehicle travels in a second state that an operation of the power source is stopped, and switch the control is so that the support of the drive is more intensified in the inertia travel, wherein
the supporting device is configured to include an operation supporting device for supporting an operation by a driver as the support of the drive,
the controller is configured to set a start condition of an operation support by the operation supporting device to such a condition that the operation support by the operation supporting device can be easily started in a first operation start condition in the inertia travel as compared with a second operation start condition in the ordinary travel such that the support by the operation supporting device can be easily started in the inertia travel as compared with the ordinary travel, and
wherein the inertia travel is a travel state in which at least any one of an acceleration requesting operation to the vehicle or a deceleration requesting operation to the vehicle is not executed.

2. The vehicle control device according to claim 1, wherein a parameter for determining a start of operation of an operation support by the operation supporting device or an operation threshold value set to the parameter is changed to a side where a timing of an operation support by the operation supporting device is advanced in the inertia travel as compared with the ordinary travel.

3. The vehicle control device according to claim 2, wherein, in the inertia travel, a preparation of the support is executed before the support is started by the supporting device.

4. The vehicle control device according to claim 1, wherein the control is switched based on peripheral environment information of the vehicle.

5. The vehicle control device according to claim 1, wherein control can be shifted to control for causing the vehicle to travel by inertia according to an operation while the vehicle travels.

6. The vehicle control device according to claim 1, wherein when a deceleration requesting operation to the vehicle is executed, control is not switched to the control in the inertia travel.

7. The vehicle control device according to claim 1, wherein a support state of the supporting device is displayed by controlling a display device.

8. The vehicle control device according to claim 1, wherein when a time until the support by the support device is operated and a behavior of the vehicle actually appears is shortened in the inertia travel as compared with the ordinary travel.

9. The vehicle control device according to claim 2, wherein the control is switched based on peripheral environment information of the vehicle.

10. The vehicle control device according to claim 3, wherein the control is switched based on peripheral environment information of the vehicle.

11. A vehicle control device, comprising:
a power source configured to cause a vehicle to travel;
a supporting device configured to support a drive of the vehicle; and
a controller configured to switch control of the supporting device for supporting the drive of the vehicle between an ordinary travel in which the vehicle travels in a first state that the power source for causing the vehicle to travel is operated and an inertia travel in which the vehicle travels in a second state that an operation of the power source is stopped, and switch the control is so that the support of the drive is more intensified in the inertia travel, wherein
the supporting device is configured to include a recognition supporting device for supporting recognition of information by a driver as the support of the drive, the recognition supporting device is configured to execute a support for making the recognition of the information easy in the inertia travel as compared with the ordinary travel, and
wherein the inertia travel is a travel state in which at least any one of an acceleration requesting operation to the vehicle or a deceleration requesting operation to the vehicle is not executed.

12. The vehicle control device according to claim 11, wherein the recognition supporting device supports recognition of information by a driver as a support of the drive by providing information useful for drive or reducing a load for obtaining information.

13. The vehicle control device according to claim 11, wherein the support is executed by controlling the supporting device according to a vehicle forward in a travel direction of the vehicle.

14. The vehicle control device according to claim 12, wherein the support is executed by controlling the supporting device according to a vehicle forward in a travel direction of the vehicle.

15. The vehicle control device according to claim 11, wherein the control is switched based on peripheral environment information of the vehicle.

16. The vehicle control device according to claim 12, wherein the control is switched based on peripheral environment information of the vehicle.

17. The vehicle control device according to claim 13, wherein the control is switched based on peripheral environment information of the vehicle.

18. A vehicle control system, comprising:
a power source configured to cause a vehicle to travel;
a supporting device configured to support a drive of the vehicle; and
a vehicle control device configured to switch control of the supporting device between an ordinary travel in which the vehicle travels in a first state that the power source is operated and an inertia travel in which the vehicle travels in a second state that an operation of the power source is stopped, wherein
the supporting device is configured to include an operation supporting device for supporting an operation by a driver as the support of the drive and a recognition supporting device for supporting recognition of information by the driver as the support of the drive, the vehicle control device is configured to switch the control so that the support of the drive is more intensified in the inertia travel, the vehicle control device is configured to set a start condition of an operation support by the operation supporting device to such a condition that the operation support by the operation supporting device can be easily started in a first operation start condition in the inertia travel as compared with a second operation start condition in the ordinary travel such that the support by the operation supporting device can be easily started in the inertia travel as compared with the ordinary travel, the recognition supporting device is configured to switch a support for making the recognition of the information easy in the inertia travel as compared with the ordinary travel, and wherein the inertia travel is a travel state in which at least any one of an acceleration requesting operation to the vehicle or a deceleration requesting operation to the vehicle is not executed.

19. The vehicle control system according to claim 18, further comprising:

a display device capable of displaying a support state of the supporting device.

* * * * *